United States Patent Office 2,977,366
Patented Mar. 28, 1961

2,977,366

ISOMERIZATION OF ISORESERPIC AND ISODESERPIDIC ACID LACTONES

Robert Joly, Montmorency, Robert Bucourt, Villiers-le-Bel, and Julien Warnant, Neuilly-sur-Seine, France, assignors to Les Laboratoires Francais de Chimiotherapie, Paris, France, a corporation of France No Drawing. Filed Feb. 18, 1960, Ser. No. 9,448

Claims priority, application France Aug. 9, 1957

4 Claims. (Cl. 260—287)

The present invention relates to a process of producing the lactones of reserpic acid and deserpidic acid, important intermediates in the synthesis of reserpine and deserpidine.

The present application is a continuation-in-part of the previously filed U.S. patent applications, Serial No. 751,865, filed July 30, 1958, in the name of Robert Joly and Robert Bucourt, and entitled "Process of Producing the Lactone of Reserpic Acid," now abandoned, and Serial No. 784,845, filed January 5, 1959, in the name of Robert Joly and Julien Warnant, and entitled "Process of Producing the Lactone of Deserpidic Acid," now abandoned. Both applications are commonly assigned.

In co-pending, commonly assigned application Serial No. 693,028, filed on October 29, 1957, and entitled "Polycyclic Compounds and Process of Preparing Same," now U.S. Patent No. 2,952,682, a synthesis of reserpine is described in the course of which the double bond in the levorotatory lactone of $18\beta$-hydroxy-11,17$\alpha$-dimethoxy-$\Delta^{3(4)}$-20$\alpha$-yohimbene-16$\beta$ - carboxylic acid is hydrogenated by means of zinc in the presence of acetic acid to give the 3$\beta$-isomer. The levorotatory lactone of $18\beta$-hydroxy-11,17$\alpha$-dimethoxy-$\Delta^{3(4)}$ - 20$\alpha$ - yohimbene - 16$\beta$-carboxylic acid is prepared by refluxing the levorotatory (in ethanol) lactone of $18\beta$-hydroxy-11,17$\alpha$-dimethoxy-3-oxo-2,3-seco-20$\alpha$-yohimbane-16$\beta$-carboxylic acid with phosphorus oxychloride. The lactone of the $\Delta^{3(4)}$-yohimbene compound is not isolated from the reaction mixture after removal of excess phosphorus oxylchloride by distillation and the yield in this reaction step is only 52% of the theoretical yield calculated for the lactone of $18\beta$-hydroxy-11,17$\alpha$-dimethoxy-3-oxo-2,3-seco - 20$\alpha$ - yohimbane-16$\beta$-carboxylic acid used as starting material.

When using other reducing agents, for instance, an alkali metal boronhydride, the corresponding 3$\alpha$-isomer, i.e., the lactone of isoreserpic acid is obtained. It is known that 3$\alpha$-yohimbane compounds can be isomerized to the corresponding 3$\beta$-yohimbane compounds by heating with trimethylacetic acid at elevated temperatures, for instance, by boiling under reflux with xylene containing 10% of trimethylacetic acid. Said isomerization reaction requires a rather prolonged reaction time, namely about 14 hours. Such a prolonged reaction time is, of course, of considerable disadvantage in the production of reserpine on an industrial scale.

When applying said process of reduction and isomerization to the dextrorotatory (in dimethylformamide) lactone of $18\beta$ - hydroxy-17$\alpha$-methoxy-$\Delta^{3(4)}$-20$\alpha$-yohimbene-16$\beta$-carboxylic acid, catalytic reduction to the lactone of $18\beta$-hydroxy-17$\alpha$-methoxy-3$\alpha$,20$\alpha$ - yohimbane - 16$\beta$-carboxylic acid, i.e., the lactone of isodeserpidic acid, proceeds in a satisfactory manner. However, the reduction product is not epimerized by the action of trimethylacetic acid.

It is one object of the present invention to provide a process of producing the lactone of reserpic acid in excellent yields in a simple manner and within only a fraction of the reaction time required heretofore.

It is another object of the present invention to provide a simple and effective process of epimerizing the lactone of $18\beta$-hydroxy-17$\alpha$-methoxy-3$\alpha$,20$\alpha$ - yohimbane - 16$\beta$-carboxylic acid (isodeserpidic acid) to give the lactone of deserpidic acid with a yield of at least 80% of the theoretical yield.

These and other objects of the present invetnion and advantageous features thereof will become more apparent as the description proceeds.

In principle, the process according to the present invention involves isomerizing the lactones of isoreserpic acid and isodeserpidic acid by heating them for short periods of time with formic acid.

According to a preferred method of the present invention, the lactone of isoreserpic acid is isomerized to the lactone of reserpic acid by heating it in an excess of at least 98% formic acid at a temperature of about 100° C. for 15 minutes, diluting the cooled reaction mixture with water, neutralizing the acid by means of triethylamine, and isolating the lactone of reserpic acid.

In addition, according to the present invention the lactone of isodeserpidic acid is isomerized to the lactone of deserpidic acid by heating it with an excess of concentrated formic acid, preferably with at least 98% formic acid, for a prolonged period of time, preferably for about 48 hours at a temperature of about 100° C. (or refluxing). Isomerization of the lactone is thereby achieved with yields of about 80–90%. The resulting lactone of deserpidic acid is purified by conversion into the formate. The product isolated from the mother liquors can be recycled and again subjected to a treatment with boiling formic acid for about 48 hours.

The increased yield as well as the simplicity of the procedure render this process of isomerization highly advantageous in comparison with the previously described processes wherein reduction is effected by means of zinc and acetic acid followed by a separation of the epimers or where isomerization is effected with trimethylacetic acid.

Compared with the heretofore known methods of producing the lactones of reserpic acid and deserpidic acid in the course of the synthesis of reserpine and deserpidine, the process of the present invention permits the production of said lactones in a considerably higher yield. The yield is 90% of the theoretical amount calculated for the lactones of $18\beta$ - hydroxy - 17$\alpha$ - methoxy - 3-oxo - 2,3-seco-20$\alpha$-yohimbane - 16$\beta$ - carboxylic acid and its 11-methoxy analog.

Another advantage of the present process is that no additional solvent is required in the isomerization of the isoreserpic and isodeserpidic acid lactones and that with isoreserpic acid lactone the reaction time is reduced to about one twentieth of the reaction time required for isomerization by means of trimethylacetic acid, while with isodeserpidic acid lactone, refluxing with alkanoic acids higher than formic acid produce little if any isomerization contrary to the course of isomerization of isoreserpic acid lactone. Acetic acid is practically without effect. In addition, formic acid which isomerizes isoreserpic acid lactone giving a 90% yield after about 15 minutes, requires a considerably longer period of time to effect isomerization of the lactone of isodeserpidic acid when operating under the same conditions.

The starting isoreserpic acid lactone and isodeserpidic acid lactone can be prepared by known processes such as that described by Woodward.

While we prefer the use of anhydrous formic acid, small amounts of water present in technical grade formic acid is not deleterious. Technical formic acid containing at least 98% formic acid gives the same results as anhydrous formic acid in the isomerization reaction.

The following examples serve to illustrate the present

EXAMPLE I

*Isomerization of the lactone of isoreserpic acid by means of formic acid*

9.12 g. of the lactone of 18β-hydroxy-11,17α-dimethoxy-3α,20α-yohimbane-16β-carboxylic acid, levorotatory in chloroform, are mixed with 50 cc. of 99% formic acid. The mixture is heated to 100° C. for 15 minutes. After cooling, 500 cc. of water are added, the solution is cooled to +10° C., and 200 cc. of triethylamine are added slowly to the mixture while keeping the temperature at +10° C. The mixture is stirred for 1 hour. The precipitated compound is filtered with suction, washed with water, and dried in a vacuum. 8.74 g. (96% of the theoretical yield) of the lactone of the reserpic acid are obtained. The compound is in all respects identical with that obtained when starting from natural reserpine. It shows the same characteristics as they are described in the literature.

EXAMPLE II

*Isomerization of the lactone of 18β-hydroxy-17α-methoxy-3α,20α-yohimbane-16β-carboxylic acid (the lactone of isodeserpidic acid) by means of formic acid*

For isomerization it is of advantage to first convert the lactone into its hydrochloride. For this purpose the crude lactone of 18β-hydroxy-17α-methoxy-3α,20α-yohimbane-16β-carboxylic acid is dissolved in aqueous tetrahydrofuran containing 50% of water to which 10% of its volume of formic acid has been added, and an excess of hydrochloric acid is admixed thereto. The hydrochloride crystallizes immediately. It is filtered off and washed first with aqueous tetrahydrofuran, containing 50% of water and then with water by trituration, until the wash waters have a pH of 6.0 to 7.0. The analysis of the dried hydrochloride having a specific rotation $[\alpha]_D^{20} = -7°$ (c.=0.5% in dioxane containing 50% of water) shows a chlorine content of 8.7% (theoretical amount: 9.11%).

10 g. of the hydrochloride of the lactone of 18β-hydroxy-17α-methoxy-3α,20α-yohimbane-16β-carboxylic acid are boiled under reflux in a nitrogen atmosphere with 50 cc. of pure formic acid for 48 hours. The mixture is then cooled to 20° C. and diluted by the addition of 50 cc. of water. The resulting solution is then added to a mixture of 120 g. of sodium bicarbonate and 300 cc. of water.

The lactone of deserpidic acid (i.e. the lactone of 18β-hydroxy-17α-methoxy-3β,20α-yohimbane-16β-carboxylic acid) precipitates. It is filtered off, washed with water until neutral and dried. The crude reaction product, which is obtained in an amount of 8.55 g., contains 90% of deserpidic acid lactone and 10% of isodeserpidic acid lactone. For purification it is converted into the formate by dissolving 5 g. thereof in 15 cc. of acetone and adding 1.5 cc. of pure formic acid to the solution. Heat is evolved and the formate of the lactone crystallizes immediately.

It is cooled with ice, filtered, and washed with ice-cold acetone. The washed formate is then dissolved, without previous drying, in 100 cc. of water. 2.5 g. of sodium bicarbonate are added in small portions thereto. The precipitate is filtered, washed until neutral, and dried. 3.5 g. of deserpidic acid lactone are obtained. Its melting point is 335° C.; its specific rotation is $[\alpha]_D^{20} = +9°$ (c.=0.5% in chloroform). The compound is identical with the compound obtained by sterospecific reduction of the lactone of 18β-hydroxy-17α-methoxy-Δ³⁽⁴⁾-20α-yohimbene-16β-carboxylic acid with zinc and acetic acid.

EXAMPLE III

*Comparison of isomerization of isoreserpic and isodeserpidic acid lactones with refluxing acetic and formic acids*

Isoreserpic acid lactone was isomerized with both formic acid, acetic acid and propionic acid by refluxing the lactone in the acids as in Example I. When refluxing with formic acid a 96% yield of reserpic acid lactone is obtained after a 15 minute reflux. When refluxing with acetic acid a 70% yield of reserpic acid lactone is obtained after refluxing for 30 minutes. When refluxing with propionic acid an 80% yield of reserpic acid lactone is obtained after refluxing for 30 minutes. When refluxing with a solution of ten volume percent of trimethylacetic acid in xylene, according to U.S. Patent No. 2,883,384, a 79% yield of reserpic acid lactone was obtained after refluxing for 13 hours. Table I demonstrates these values.

TABLE I

*Isomerization of isoreserpic acid lactone*

| Isomerization Agent | Time of Refluxing | Yield of Reserpic Acid Lactone, percent |
|---|---|---|
| Formic Acid | 15 Minutes | 96 |
| Acetic Acid | 30 Minutes | 70 |
| Propionic Acid | 30 Minutes | 80 |
| Trimethylacetic Acid in Xylene | 13 Hours | 79 |

This demonstrates that, unexpectedly the isomerization is practically complete after a 15 minute period of refluxing with formic acid as compared with isomerization with the other lower alkanoic acids.

Isodeserpidic acid lactone hydrochloride was treated under the same conditions as above to effect isomerization. When refluxed with acetic acid little, if any, isomerization occurs, regardless of the period of reflux. When refluxing isodeserpidic lactone with formic acid there was obtained a varying amount of deserpidic acid lactone, depending upon the period of reflux according to Table II, which follows.

TABLE II

*Isomerization of isodeserpidic acid lactone with formic acid*

Time of Refluxing:        Isomerization, percent
After 15 minutes _____ 10
After 3 hours _____ 35
After 24 hours _____ 80
After 48 hours _____ 90

From these results, it can be seen that of the lower alkanoic acids only refluxing formic acid will produce an isomerization of isodesperpidic acid lactone, and the isomerization of isoreserpic acid is unexpectedly improved when refluxing formic acid is used.

The preceding examples are illustrative of the invention only and are not to be construed as limitations. More particularly, the nature of the solvents and of the reagents and the order of introducing the same into the reaction vessel may be varied by those skilled in the art in accordance with the principles set forth herein and in the claims annexed hereto. More in particular, the process is not limited to one optically active form of the starting material. Enantiomorphous and recemic compounds corresponding to those used in the examples may also be employed as starting materials. Such changes and modifications as well as others within the skill of the art are to be construed as within the spirit of the invention and the scope of the appended claims.

We claim:

1. The process of isomerizing isoreserpic acid lactone to produce reserpic acid lactone comprising the steps of refluxing isoreserpic acid lactone with at least a 98% formic acid for a period of time sufficient to effect isomerization to reserpic acid lactone and isolating said reserpic acid lactone.

2. The process of claim 1 wherein said period of time sufficient to effect isomerization is about 15 minutes.

3. The process of isomerizing the lactone of isodeserpidic acid to the lactone of deserpidic acid which comprises the steps of refluxing the lactone of isodeserpidic acid with an excess of at least 98% formic acid for about 48 hours and recovering the lactone of deserpidic acid.

4. The process of isomerizing the lactone of isodeserpidic acid to the lactone of deserpidic acid which comprises heating an acid addition salt of the lactone of isodeserpidic acid to reflux with an excess of at least a 98% acid for a time sufficient to effect isomerization and recovering the lactone of deserpidic acid.

References Cited in the file of this patent

FOREIGN PATENTS 1,188,530 France _____ Sept. 23, 1959